United States Patent
Matsuno et al.

(10) Patent No.: US 9,637,107 B2
(45) Date of Patent: May 2, 2017

(54) TRAVEL CONTROL APPARATUS FOR VEHICLE

(71) Applicant: FUJI JUKOGYO KABUSHIKI KAISHA, Tokyo (JP)

(72) Inventors: Koji Matsuno, Tokyo (JP); Satoru Akiyama, Tokyo (JP); Takayuki Nagase, Tokyo (JP); Eiichi Shiraishi, Tokyo (JP); Shiro Ezoe, Tokyo (JP); Hajime Oyama, Tokyo (JP); Yasushi Takaso, Tokyo (JP); Masato Mizoguchi, Tokyo (JP); Harunobu Horiguchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/934,891

(22) Filed: Nov. 6, 2015

(65) Prior Publication Data

US 2016/0132055 A1 May 12, 2016

(30) Foreign Application Priority Data

Nov. 7, 2014 (JP) ................................. 2014-227173

(51) Int. Cl.
  *G05D 1/00* (2006.01)
  *B60W 10/20* (2006.01)
  (Continued)

(52) U.S. Cl.
  CPC ............ *B60W 10/20* (2013.01); *B60W 10/04* (2013.01); *B60W 10/184* (2013.01);
  (Continued)

(58) Field of Classification Search
  CPC .................................................. B60W 10/20
  See application file for complete search history.

(56) References Cited

U.S. PATENT DOCUMENTS 6,285,933 B1 * 9/2001 Kohler ................... G01P 21/02
                                                                    303/122.05
2012/0109461 A1   5/2012 Nitta et al.
(Continued)

FOREIGN PATENT DOCUMENTS

JP       10-194150 A     7/1998
JP     2006-111226 A    4/2006
(Continued)

OTHER PUBLICATIONS

Notification of Reasons for Refusal Japanese Patent Application No. 2014-227173 dated May 31, 2016 with English translation.

*Primary Examiner* — Thomas Tarcza
*Assistant Examiner* — Michael Berns
(74) *Attorney, Agent, or Firm* — McDermott Will & Emery LLP (57) ABSTRACT

In a travel control apparatus for a vehicle, a travel environment information acquisition unit acquires travel environment information on a travel environment of the vehicle. A travel information detector detects travel information on the vehicle in order to execute automatic driving control based on such information pieces. A lateral force generator generates lateral force to be applied to the vehicle during the automatic driving control. A torsion bar is interposed on a torque transmission path of a steering system. A steering wheel angle detector detects a steering wheel angle. A lateral force detector detects the lateral force acting on the vehicle. An intervening steering operation determination unit determines that a driver has performed an intervening steering operation when a characteristic of the detected steering wheel angle and lateral force differs from a reference characteristic that varies univocally when the steering wheel is in a no load condition.

16 Claims, 7 Drawing Sheets (51) Int. Cl.
    *B60W 10/04*     (2006.01)
    *B60W 50/10*     (2012.01)
    *B62D 9/00*     (2006.01)
    *B60W 10/184*     (2012.01)
    *B60W 30/12*     (2006.01)
    *B60W 30/16*     (2012.01)
    *B62D 15/02*     (2006.01)
    *B62D 1/28*     (2006.01)
    *B60W 50/029*     (2012.01)

(52) U.S. Cl.
    CPC ............ *B60W 30/12* (2013.01); *B60W 30/16* (2013.01); *B60W 50/10* (2013.01); *B62D 1/286* (2013.01); *B62D 9/005* (2013.01); *B62D 15/025* (2013.01); *B60W 2050/0297* (2013.01); *B60W 2520/10* (2013.01); *B60W 2520/125* (2013.01); *B60W 2520/14* (2013.01); *B60W 2540/18* (2013.01); *B60W 2550/141* (2013.01); *B60W 2550/142* (2013.01); *B60W 2550/143* (2013.01); *B60W 2550/148* (2013.01); *B60W 2550/30* (2013.01); *B60W 2550/402* (2013.01)

(56) References Cited

U.S. PATENT DOCUMENTS

2015/0019082 A1\*   1/2015   Inoue ................... B62D 1/286
                                                                   701/41
2015/0336607 A1   11/2015   Inoue

FOREIGN PATENT DOCUMENTS

| JP | 2012-96568 A | 5/2012 |
|---|---|---|
| WO | 2013/128638 | 9/2013 |
| WO | 2014115262 A1 | 7/2014 |

\* cited by examiner

TRAVEL CONTROL APPARATUS FOR VEHICLE

CROSS-REFERENCE TO RELATED APPLICATIONS

The present application claims priority from Japanese Patent Application No. 2014-227173, filed on Nov. 7, 2014, the entire contents of which are hereby incorporated by reference.

BACKGROUND

1. Technical Field

The present invention relates to a travel control apparatus for a vehicle that performs automatic driving control by recognizing a travel environment and detecting travel information relating to the vehicle.

2. Related Art

Recently, various travel control apparatuses using automatic driving technology have been developed and proposed with the aim of allowing a driver to drive a vehicle in increased comfort. In this type of travel control apparatus, various types of travel control (for example, following control relative to a preceding vehicle, lane keep control, lane deviation prevention control, overtaking control relative to a preceding vehicle, and so on) for the purpose of automatic driving can be performed by detecting the travel environment of the vehicle through recognition of the travel environment on the exterior of the vehicle using various recognition devices employing a camera, a laser radar, a millimeter wave radar, an ultrasonic sonar, and so on.

When a driver intervenes in (overrides) the automatic driving performed by this type of travel control apparatus by executing a predetermined driving operation, the will of the driver, expressed through the driving operation, is preferably reflected appropriately in the travel control. In response to this requirement, Japanese Unexamined Patent Application Publication (JP-A) No. H10-194150, for example, discloses a technique for determining that an emergency operation (an intervening driving operation) has been performed in order to avoid danger and switching forcibly to a manual steering mode when, during automatic steering, a torque (a steering torque) detected by a steering torque sensor exceeds a predetermined value or a brake operation is detected by a brake sensor.

SUMMARY OF THE INVENTION

In the technique disclosed in JP-A No. H10-194150, however, an intervening driving operation can only be determined on the basis of the steering torque when each part of a steering system including the steering torque sensor is functioning normally. Therefore, in cases such as when a malfunction of some kind occurs in the steering torque sensor during automatic driving and evacuation control is performed through automatic driving in response to the malfunction, it may be difficult to determine that the driver has performed an intervening steering operation, and correspondingly difficult to switch quickly from automatic driving to manual driving by the driver.

It is desirable to provide a travel control apparatus for a vehicle with which an intervening steering operation by a driver can be determined accurately even when a malfunction occurs in a steering system during automatic driving.

An aspect of the present invention provides a travel control apparatus for a vehicle, the travel control apparatus having a travel environment information acquisition unit that acquires travel environment information relating to a travel environment in which a vehicle travels, and a travel information detector that detects travel information relating to the vehicle in order to execute automatic driving control on the basis of the travel environment information and the travel information relating to the vehicle, the travel control apparatus including: a lateral force generator that generates lateral force to be applied to the vehicle during the automatic driving control; a torsion bar interposed on a torque transmission path of a steering system that extends from a steering wheel to a steered wheel; a steering wheel angle detector that detects a steering wheel angle on the steering wheel side of the torsion bar; a lateral force detector that detects the lateral force acting on the vehicle; and an intervening steering operation determination unit that determines that a driver has performed an intervening steering operation when a characteristic of the steering wheel angle detected by the steering wheel angle detector and the lateral force detected by the lateral force detector differs from a reference characteristic of the steering wheel angle and the lateral force, the reference characteristic varying univocally when the steering wheel is in a no load condition.

DETAILED DESCRIPTION

An implementation of the present invention will be described below with reference to the drawings. The drawings pertain to a single implementation of the present invention, FIG. 1 being an overall view illustrating a configuration of a travel control apparatus, FIG. 2 being a schematic view illustrating a configuration of an electric power steering device, FIG. 3 being a flowchart illustrating a intervening steering operation determination routine executed when a malfunction occurs in a steering system, FIG. 4 being an illustrative view illustrating a rightward intervening steering operation determination area used during evacuation travel performed by steering control, FIG. 5 being an illustrative view illustrating a leftward intervening steering operation determination area used during evacuation travel performed by steering control, FIG. 6 being an illustrative view illustrating the rightward intervening steering operation determination area used during evacuation travel performed by brake control, and FIG. 7 being an illustrative view illustrating the leftward intervening steering operation determination area used during evacuation travel performed by brake control.

Figure 1:
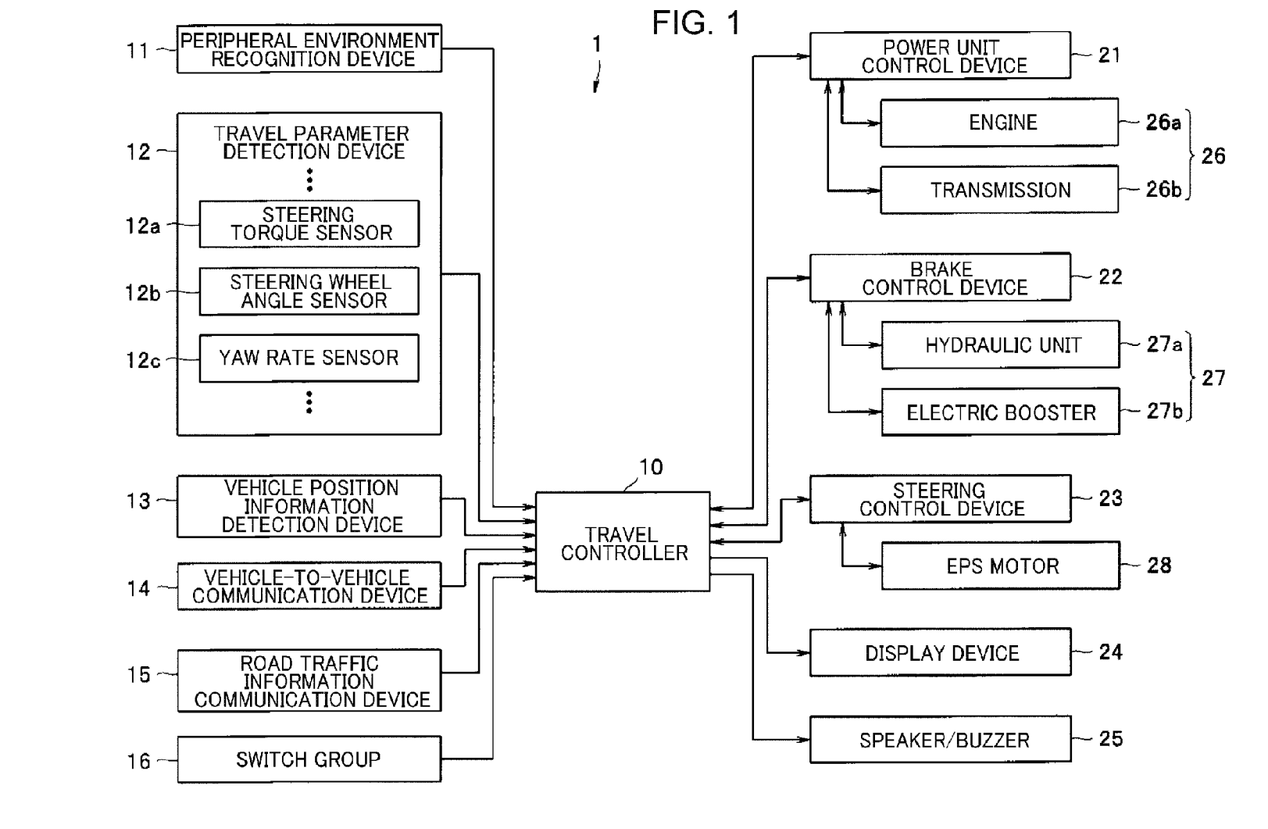
FIG. 1 is an overall view illustrating a configuration of a travel control apparatus.

In FIG. 1, a reference numeral 1 denotes a travel control apparatus for a vehicle. Various input devices, including a peripheral environment recognition device 11, a travel parameter detection device 12, a vehicle position information detection device 13, a vehicle-to-vehicle communication device 14, a road traffic information communication device 15, and a switch group 16, and various output devices, including a power unit control device 21, a brake control device 22, a steering control device 23, a display device 24, and a speaker/buzzer 25, are connected to a travel controller 10 as main parts of the travel control apparatus 1.

The peripheral environment recognition device 11 is constituted by a camera device (a stereo camera, a monocular camera, a color camera, or the like; not illustrated) that includes a solid state imaging device and obtains vehicle information by photographing an external environment of the vehicle from the interior of a vehicle cabin, and a radar device (a laser radar, a millimeter wave radar, or the like; not illustrated) that receives reflection waves from three-dimensional objects existing on the periphery of the vehicle.

The peripheral environment recognition device 11 performs conventional grouping processing, for example, in relation to distance information on the basis of the image information photographed by the camera device, and by comparing the grouped distance information with preset three-dimensional road shape data, three-dimensional object data, and so on, extracts lane division line data, side wall data indicating guard rails and curbstones existing alongside a road, three-dimensional object data indicating vehicles and the like. The peripheral environment recognition device 11 then detects relative positions (distances and angles), as well as speeds, of the objects included in the data relative to the vehicle.

The peripheral environment recognition device 11 also detects positions (distances and angles), as well as speeds, of three-dimensional objects from which reflection waves are received on the basis of reflection wave information obtained by the radar device. Note that in this implementation, a maximum distance (a distance to a three-dimensional object or a furthest distance of a lane division line) that can be recognized by the peripheral environment recognition device 11 is set as a visibility limit. In one implementation, the peripheral environment recognition device 11 may function as a travel environment information acquisition unit.

The travel parameter detection device 12 includes various types of sensors, such as a steering torque sensor 12a, a steering wheel angle sensor 12b serving as a steering wheel angle detector, and a yaw rate sensor 12c serving as a lateral force detector, and detects a steering torque Tdrv, a steering wheel angle θH, a yaw rate γ serving as a lateral force, a vehicle speed V, an accelerator opening, a throttle opening, a brake switch signal, a road surface gradient of a travel road surface, an estimated road surface friction coefficient value μ, and so on, for example, as travel information relating to the vehicle. In one implementation, the travel parameter detection device 12 may function as a travel information detector.

The vehicle position information detection device 13 is a conventional navigation system, for example, which receives radio waves emitted by a global positioning system (GPS) satellite, detects a current position on the basis of the radio wave information, and specifies the position of the vehicle on map data stored in advance on a flash memory, a compact disc (CD), a digital versatile disc (DVD), a Blu-ray (registered trademark) disc, a hard disk drive (HDD), or the like.

The pre-stored map data include road data, facility data, and so on. The road data include link position information, link type information, node position information, node type information, information indicating connection relationships between the nodes and the links, or in other words information indicating branching and merging locations on the road, information indicating a maximum vehicle speed on branch roads, and so on. When an operator inputs a destination while the vehicle position is displayed in a map position, a route from a starting location to the destination can be calculated in a predetermined manner, displayed on the display device 24, which is constituted by a display, a monitor, or the like, and output as voice guidance from the speaker/buzzer 25. In one implementation, the vehicle position information detection device 13 may function as the travel environment information acquisition unit.

The vehicle-to-vehicle communication device 14 is constituted by a short range wireless communication device having a communication area of approximately 100 [m], such as a wireless LAN, for example, and is capable of communicating directly with another vehicle without passing through a server or the like so as to exchange information with the other vehicle. Through mutual communication with the other vehicle, the vehicle-to-vehicle communication device 14 exchanges vehicle information, travel information, traffic environment information, and so on. The vehicle information includes unique information indicating a vehicle type (in this implementation, a passenger vehicle, a truck, a motorcycle, and so on). Further, the travel information includes vehicle speed and vehicle position information, information indicating whether a brake lamp is illuminated, information indicating whether a direction indicator used to indicate a right or left turn is flashing, information indicating whether a hazard lamp used during an emergency stop is flashing, and so on. Furthermore, the traffic environment information includes information that varies in accordance with the condition of road congestion information, construction work information, and so on. In one implementation, the vehicle-to-vehicle communication device 14 may function as the travel environment information acquisition unit.

The road traffic information communication device 15 is a so-called vehicle information and communication system (VICS; registered trademark) capable of receiving traffic information relating to congestion, accidents, construction work, required times, parking lots, and so on in real time from an FM multiplex broadcast or a transmitter disposed on the road, and displaying the received traffic information on the pre-stored map data described above. In one implementation, the road traffic information communication device 15 may function as the travel environment information acquisition unit.

The switch group 16 is a group of switches used by a driver to input operations relating to control for assisting driving, and is constituted by, for example, a switch for executing travel control at a preset fixed speed or a switch for executing following control to maintain an inter-vehicle distance and an inter-vehicle time to a preceding vehicle at preset fixed values, a switch for executing lane deviation prevention control to prevent the vehicle from deviating from a current travel lane, a switch for permitting execution of overtaking control in order to overtake a preceding vehicle (an overtaking subject vehicle), a switch for executing automatic driving control in which all of these control operations are performed in a coordinated fashion, a switch for setting the vehicle speed, inter-vehicle distance, inter-vehicle time, speed limit, and so on required in the respective control operations, a switch for canceling the respective control operations, and so on.

The power unit control device 21 controls a power unit 26 including an engine 26a and an automatic transmission 26b, for example. In other words, the power unit control device 21 performs various types of engine control such as fuel injection control, ignition timing control, control of an electronically controlled throttle valve, and the like on the basis of an intake air amount, a throttle opening, an engine water temperature, an intake air temperature, an oxygen concentration, a crank angle, the accelerator opening, and other vehicle information. The power unit control device 21 also performs shift control and the like on the automatic transmission 26b on the basis of a relationship between an output of the engine 26a, the current vehicle speed V, and so on, for example. Here, the power unit control device 21 is capable of generating a braking force (a braking force generated by an engine brake) for use during automatic deceleration control by controlling the output of the engine 26a and forcibly downshifting the automatic transmission 26b in order to reduce an amount of driving force transmitted to a road surface.

The brake control device 22 performs control on a braking system 27 including a hydraulic unit 27a and an electric booster 27b, for example.

Here, the hydraulic unit 27a is capable of realizing an antilock brake system (ABS) function, an antiskid control function, and so on by activating brake devices (not illustrated) of four wheels independently of brake operations performed by the driver on the basis of the brake switch, wheel speeds of the four wheels, the steering wheel angle θH, the yaw rate γ, and other vehicle information, for example. When brake force command values for the respective wheels are input into the hydraulic unit 27a from the travel controller 10, the brake control device 22 can calculate a brake fluid pressure of each wheel on the basis of the brake forces, and thereby generate the braking force used during the automatic deceleration control. Further, when the brake forces F of the respective wheels are input from the travel controller 10, for example, while a steering system including the steering control device 23 is in a predetermined malfunction condition or the like, the brake control device 22 performs yaw brake control via the hydraulic unit 27a as failsafe control. In one implementation, the brake control device 22 may function as the lateral force generator through the yaw brake control implemented via the hydraulic unit 27a.

Further, the electric booster 27b is basically used to assist a brake pedal depression force by applying thrust from an electric motor. The electric booster 27b is capable of converting motor torque generated by the electric motor into assist thrust via a ball screw or the like, and applying the assist thrust to a master cylinder piston. When a brake force command value is input into the electric booster 27b from the travel controller 10, the brake control device 22 can calculate the assist thrust on the basis of the brake force, and thereby generate the braking force used during the automatic deceleration control. Note that in this implementation, the hydraulic unit 27a includes the ABS function and so on, and therefore braking control can be performed at a higher maximum deceleration than the maximum deceleration generated by the electric booster 27b alone.

The steering control device 23 controls an assist torque generated by an electric power steering motor (EPS motor) 28 provided in an electric power steering device 30 on the basis of the vehicle speed V, the steering torque Tdrv, the steering wheel angle θH, the yaw rate γ, and other vehicle information, for example. The steering control device 23 is also capable of lane keep control for controlling travel so that the vehicle stays in a set travel lane, and lane deviation prevention control for preventing the vehicle from deviating from the travel lane. In other words, a target steering angle δtrg calculated by the travel controller 10 is input into the steering control device 23 as a control amount required for the lane keep control, the lane deviation prevention control, and so on, for example, whereupon the steering control device 23 drive-controls the electric power steering motor 28 in accordance with the input target steering angle δtrg.

Figure 2:
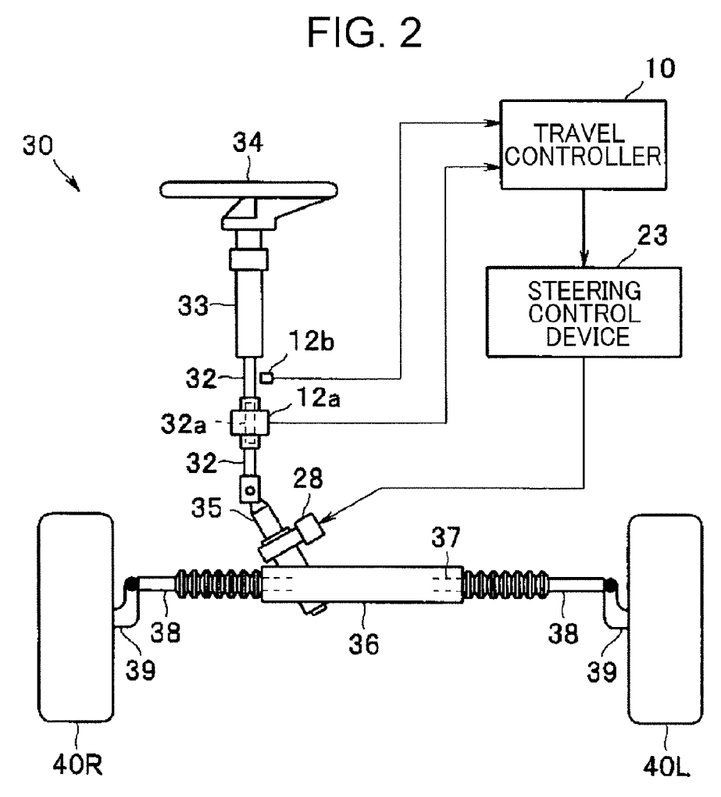
FIG. 2 is a schematic view illustrating a configuration of an electric power steering device.

The electric power steering device 30 of the steering system will now be described more specifically. As illustrated in FIG. 2, the electric power steering device 30 according to this implementation includes a steering shaft 32 supported to be free to rotate on a vehicle body frame, not illustrated in the drawing, via a steering column 33. The steering shaft 32 forms a torque transmission path of the steering system. One end side of the steering shaft 32 extends to a driving seat side, and a steering wheel 34 is fixed to one end portion of the steering shaft 32. Another end side of the steering shaft 32 extends to an engine room side, and a pinion shaft 35 is connected to another end portion of the steering shaft 32. Further, a torsion bar 32a is interposed midway on the steering shaft 32, and the steering torque sensor 12a is provided on an outer peripheral side of the torsion bar 32a. The steering torque sensor 12a can detect the steering torque generated by the driver by detecting displacement to the steering wheel 34 side and the pinion shaft 35 side, which is generated around an axis of the steering shaft 32 when the torsion bar 32a is twisted.

A steering gearbox 36 is disposed in the engine room so as to extend in a vehicle width direction, and a rack shaft 37 is inserted into and supported by the steering gearbox 36 so as to be free to reciprocate. A rack (not illustrated) is provided midway on the rack shaft 37, and a pinion (not illustrated) provided on the pinion shaft 35 meshes with the rack. As a result, a rack and pinion type steering gear mechanism is formed.

Furthermore, respective ends of the rack shaft 37 project to the left and right from the steering gearbox 36, and front knuckles 39 are connected to respective end portions thereof via a tie rod 38. The front knuckles 39 support left and right wheels 40L, 40R serving as steered wheels to be free to rotate, and are supported turnably on the vehicle body frame via kingpins (not illustrated). Hence, when the steering wheel 34 is operated such that the steering shaft 32 and the pinion shaft 35 rotate, the rack shaft 37 moves in a left-right direction in response to the rotation of the pinion shaft 35, and in response to this movement, the front knuckles 39 rotate about the kingpins (not illustrated) such that the left and right wheels 40L, 40R are turned in the left-right direction.

Moreover, the electric power steering motor 28 is connected to the pinion shaft 35 in order to apply steering torque to assist the steering torque applied to the steering wheel 34 so that a set steering angle is achieved.

More specifically, when the target steering angle δtrg required for the lane keep control, lane deviation prevention control, and so on is input from the travel controller 10 during automatic driving, for example, the steering control device 23 calculates a control current I by which the electric power steering motor 28 is driven, using Equation (1), illustrated below, for example, on the basis of an actual turn angle δ determined from the steering wheel angle θH and a deviation Δδ from the target steering angle δtrg. The steering control device 23 then generates steering torque by driving the electric power steering motor 28 using the calculated control current I.

$$I = Gi \times \int \Delta\delta + Gd \times (d\Delta\delta/dt) + Gp \times \Delta\delta \quad (1)$$

Here, Equation (1) is an equation for calculating the control current I (in other words, the steering torque) by feedback control (PID control). In Equation (1), "Gp" is a gain of a proportional term, "Gi" is a gain of an integral term, and "Gd" is a gain of a differential term. In one implementation, the steering control device 23 may function as the lateral force generator through the control implemented on the electric power steering motor 28 of the electric power steering device 30.

The display device 24 is a device for providing the driver with visual warnings and notifications, such as a monitor, a display, or an alarm lamp, for example. Further, the speaker/buzzer 25 is a device for providing the driver with aural warnings and notifications. When a malfunction occurs in one of various devices of the vehicle, the display device 24 and the speaker/buzzer 25 issue warnings to the driver as appropriate.

The travel controller 10 executes automatic steering control, automatic deceleration control, and so on for the purpose of realizing automatic driving control in which collision prevention control for preventing a collision with an obstruction or the like, fixed speed travel control, following travel control, lane keep control, lane deviation prevention control, overtaking control, and so on are implemented in a coordinated fashion.

For example, as control for realizing the lane keep control, lane deviation prevention control, and so on of the automatic driving control, the travel controller 10 performs automatic steering control via the steering control device 23 by calculating the target steering angle δtrg on the basis of the travel environment information, the travel information relating to the vehicle, and so on.

Further, the travel controller 10 detects malfunctions in the steering torque sensor 12a, the steering control device 23, the electric power steering motor 28, and so on by monitoring the steering system. Having detected a malfunction in the steering system during the automatic driving control, the travel controller 10 performs evacuation travel control for evacuating the vehicle to a safe location, for example, as failsafe control. When, in this case, the malfunction in the steering system is a partial malfunction such as a malfunction in the steering torque sensor 12a alone, for example, the travel controller 10 evacuates the vehicle by generating a lateral force (a yaw rate) through control of the electric power steering motor 28 via the steering control device 23.

When, on the other hand, the malfunction in the steering system is not confined to the steering torque sensor 12a and extends to the steering control device 23, the electric power steering motor 28, and so on, for example, the travel controller 10 evacuates the vehicle by calculating the brake forces to be applied to the respective vehicle wheels, and generating a lateral force (a yaw rate) through control of the hydraulic unit 27a via the brake control device 22.

Furthermore, when the travel controller 10 determines that the driver has intervened in the automatic driving control by performing a predetermined intervening driving operation, the travel controller 10 cancels the automatic driving control and switches to a manual driving mode in which driving operations are entrusted to the driver. To determine whether an intervening driving operation has been performed, the travel controller 10 may determine whether the driver has performed an intervening steering operation. In this case, the travel controller 10 basically determines that the driver has performed an intervening steering operation when an absolute value of the steering torque Tdrv detected by the steering torque sensor 12a equals or exceeds a preset threshold, for example.

Moreover, to determine accurately whether the driver has performed an intervening steering operation during evacuation travel control executed in response to a malfunction in the steering system, the travel controller 10 can determine whether the driver has performed an intervening steering operation on the basis of a relationship between the steering wheel angle θH detected by the steering wheel angle sensor 12b and the yaw rate γ serving as the lateral force acting on the vehicle.

To enable the travel controller 10 to determine whether an intervening steering operation has been performed, reference characteristics indicating the relationship between the steering wheel angle θH and the yaw rate γ in a case where the steering wheel 34 is in a no load condition is mapped in advance, as illustrated in FIGS. 4 to 7, for example, and stored in the travel controller 10.

Figure 4:
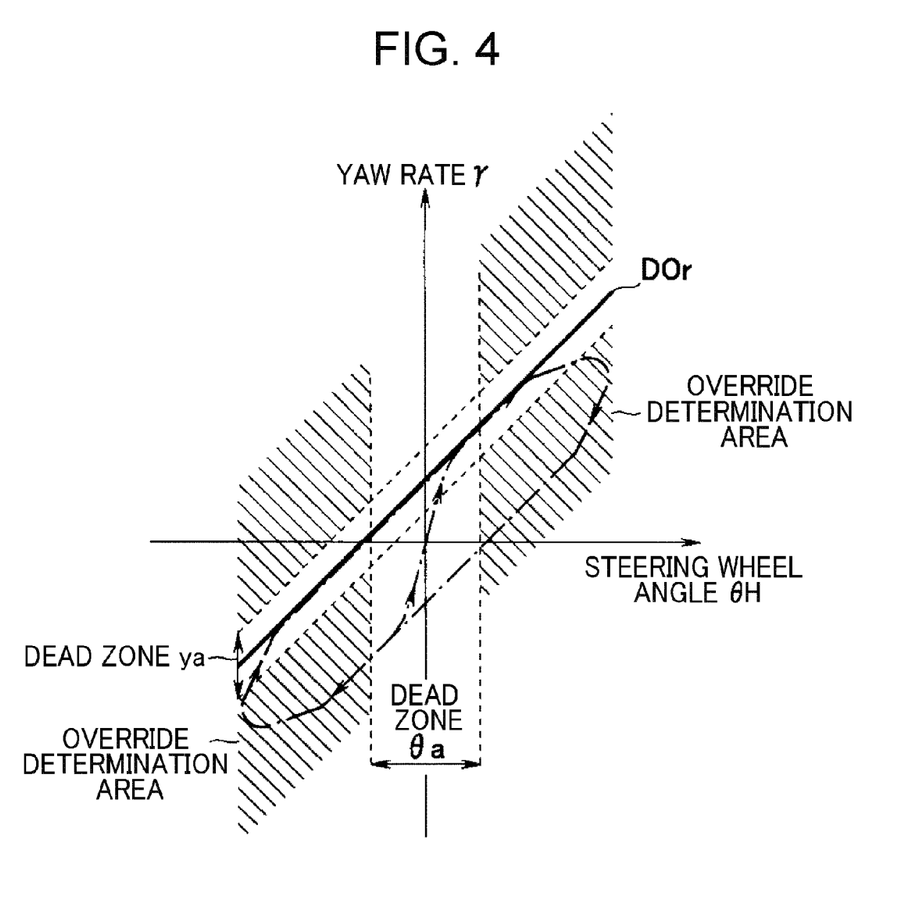
FIG. 4 is an illustrative view illustrating a rightward intervening steering operation determination area used during evacuation travel performed by steering control.
Figure 5:
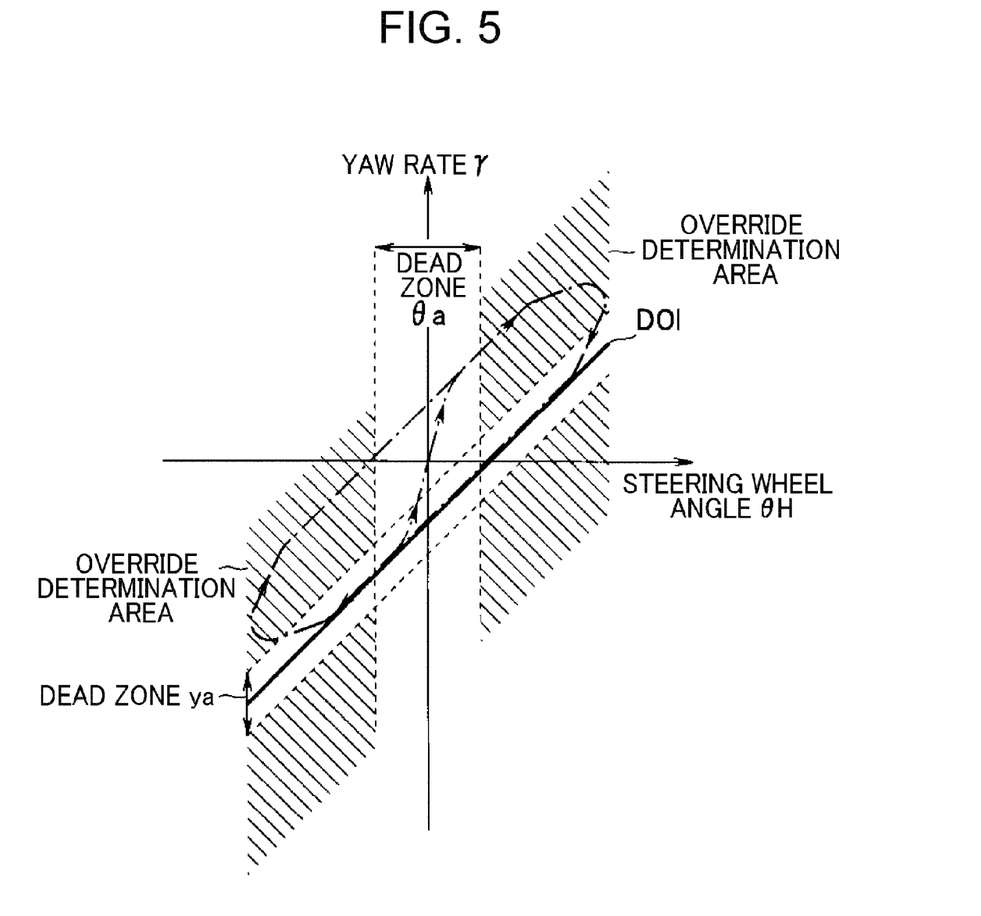
FIG. 5 is an illustrative view illustrating a leftward intervening steering operation determination area used during evacuation travel performed by steering control.

When the steering torque generated by the electric power steering motor 28 is applied to the steering system while the steering wheel 34 is in the no load condition, i.e. when an intervening steering operation has not been performed by the driver, the relationship between the yaw rate γ (the lateral force) generated by the steering and the steering wheel angle θH takes the form of predetermined hysteresis determined univocally for each vehicle speed V, as illustrated by dot-dash lines in FIGS. 4 and 5, for example. Hence, on the basis of these relationships, relationships between the steering wheel angle θH and the yaw rate γ at each vehicle speed V in respective turning directions (rightward and leftward) are set in advance as reference characteristics DOr, DOl and stored in the travel controller 10. When, on the other hand, the driver performs an intervening steering operation during steering performed by the electric power steering motor 28, torsion occurs in the torsion bar 32a such that the relationship between the steering wheel angle θH detected by the steering wheel angle sensor 12b and the yaw rate γ detected by the yaw rate sensor 12c deviates correspondingly from the reference characteristic. Hence, on the basis of these relationships, the travel controller 10 determines that the driver has performed an intervening steering operation when the relationship between the steering wheel angle θH detected by the steering wheel angle sensor 12b and the yaw rate γ detected by the yaw rate sensor 12c is within an override determination area determined on the basis of the reference characteristic. Note, however, that the relationship between the steering wheel angle θH and the yaw rate γ likewise deviates from the reference characteristic in an area of play occurring when the steering wheel is initially turned, and therefore, to prevent erroneous determination of an intervening steering operation, a dead zone θa is provided in a predetermined steering wheel angle range based on a neutral steering wheel position. Furthermore, to prevent the relationship between the steering wheel angle θH and the yaw rate γ from moving into the override determination area due to an effect of a road surface condition or the like in a case where steering is performed only by automatic driving, a dead zone γa is also provided in a predetermined yaw rate range based on the reference characteristic.

Figure 6:
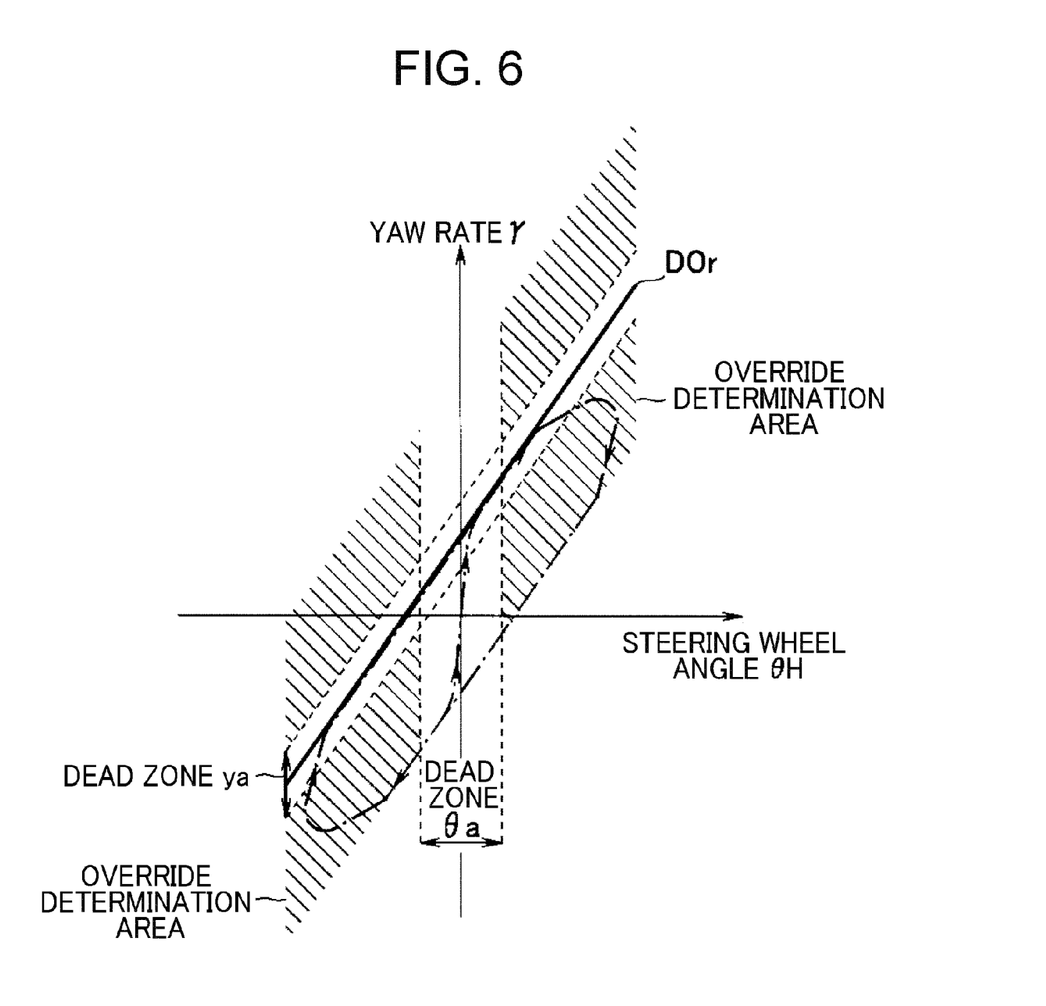
FIG. 6 is an illustrative view illustrating the rightward intervening steering operation determination area used during evacuation travel performed by brake control.
Figure 7:
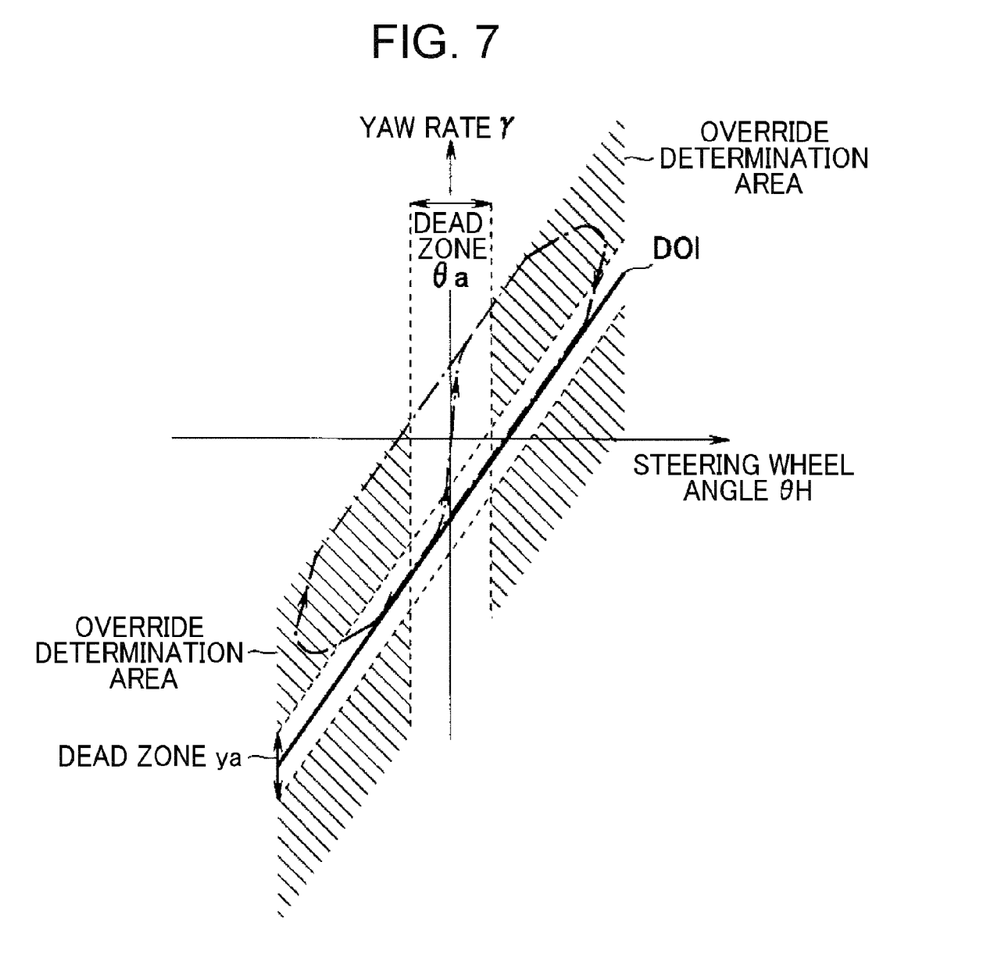
FIG. 7 is an illustrative view illustrating the leftward intervening steering operation determination area used during evacuation travel performed by brake control.

Further, when yaw brake control is performed by the hydraulic unit 27a while the steering wheel 34 is in the no load condition, i.e. when an intervening steering operation has not been performed by the driver, the relationship between the yaw rate γ (the lateral force) generated by the yaw brake control and the steering wheel angle θH takes the form of hysteresis determined univocally for each vehicle speed V, as illustrated by dot-dash lines in FIGS. 6 and 7, for example. Note, however, that in this case, the steering wheel angle θH varies in response to lateral force transmitted from the road surface to the steering system via the steered wheels, and therefore the steering wheel angle θH varies less sensitively relative to the yaw rate γ than when steering is performed by the electric power steering motor 28, as described above. Hence, on the basis of these relationships, relationships between the steering wheel angle θH and the yaw rate γ at each vehicle speed V in the respective turning directions (rightward and leftward) are set in advance as the reference characteristics DOr, DOl and stored in the travel controller 10. When, on the other hand, the driver performs an intervening steering operation during the yaw brake control performed by the hydraulic unit 27a, torsion occurs in the torsion bar 32a such that the relationship between the steering wheel angle θH detected by the steering wheel angle sensor 12b and the yaw rate γ detected by the yaw rate sensor 12c deviates correspondingly from the reference characteristic. Hence, on the basis of these relationships, the travel controller 10 determines that the driver has performed an intervening steering operation when the relationship between the steering wheel angle θH detected by the steering wheel angle sensor 12b and the yaw rate γ detected by the yaw rate sensor 12c is within the override determination area determined on the basis of the reference characteristic. Note, however, that the relationship between the steering wheel angle θH and the yaw rate γ likewise deviates from the reference characteristic in the area of play occurring when the steering wheel is initially turned, and therefore, to prevent erroneous determination of an intervening steering operation, the dead zone θa is provided in the predetermined steering wheel angle range based on the neutral steering wheel position. Furthermore, to prevent the relationship between the steering wheel angle θH and the yaw rate γ from moving into the override determination area due to the effect of the road surface condition or the like in a case where steering is performed only by automatic driving, the dead zone ya is also provided in the predetermined yaw rate range based on the reference characteristic.

In one implementation, the travel controller 10 may function together with the brake control device 22 and/or the steering control device 23 and so on as a lateral force generator, and also function as an intervening steering operation determination unit and an malfunction detector.

Figure 3:
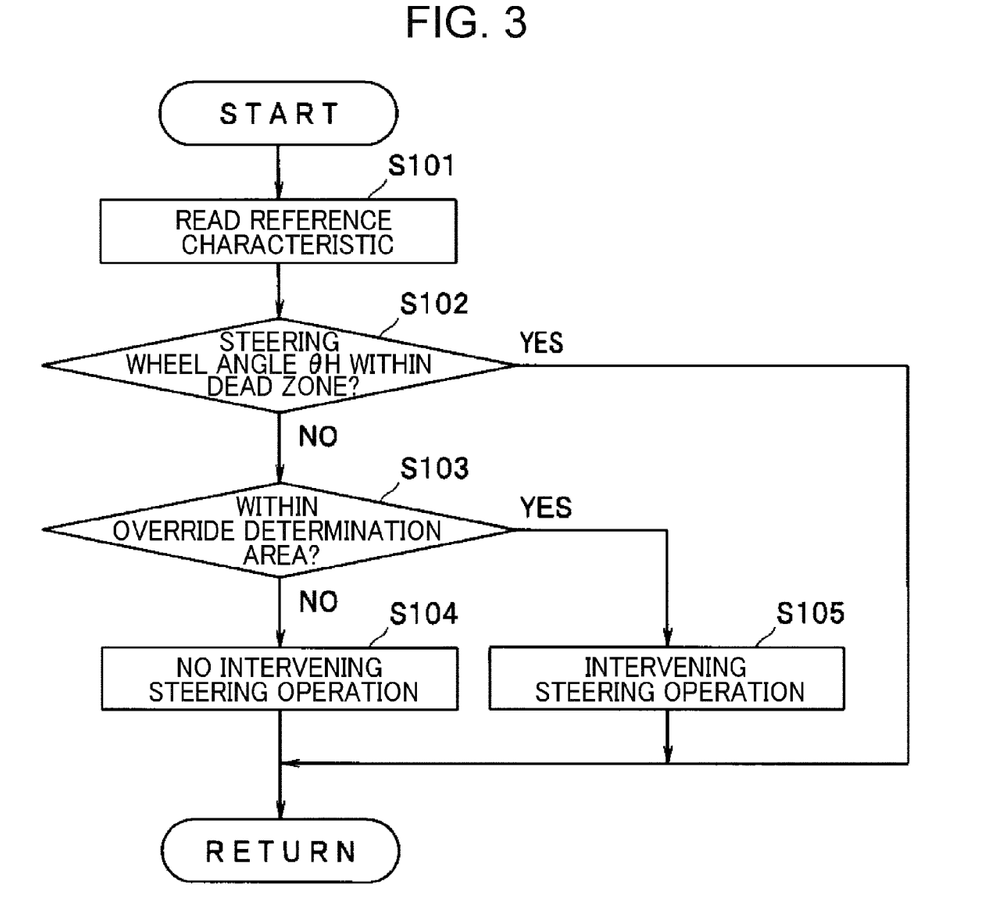
FIG. 3 is a flowchart illustrating an intervening steering operation determination routine executed when a malfunction occurs in a steering system.

Next, the determination executed by the travel controller 10 to determine whether the driver has performed an intervening steering operation will be described using a flowchart of an intervening steering operation determination routine illustrated in FIG. 3. This routine is executed repeatedly at set time intervals when a malfunction occurs in the steering system, for example. When the routine is started, first, in step S101, the travel controller 10 reads a reference characteristic DO from the plurality of preset reference characteristics DOr, DOl in accordance with the type of the current evacuation travel control, the turning direction of the vehicle, the vehicle speed V, and so on.

When the routine advances to step S102 from step S101, the travel controller 10 determines whether the steering wheel angle θH detected by the steering wheel angle sensor 12b is currently within the dead zone θa of the reference characteristic DO.

When it is determined in step S102 that the steering wheel angle θH is within the dead zone θa, the travel controller 10 exits the routine as is.

When it is determined in step S102 that the steering wheel angle θH is not within the dead zone θa, on the other hand, the routine advances to step S103, where the travel controller 10 determines whether the relationship between the steering wheel angle θH detected by the steering wheel angle sensor 12b and the yaw rate γ detected by the yaw rate sensor 12c is within the override determination area.

When it is determined in S103 that the relationship between the steering wheel angle θH detected by the steering wheel angle sensor 12b and the yaw rate γ detected by the yaw rate sensor 12c is not within the override determination area, i.e. that the relationship substantially corresponds to the reference characteristic DO, the routine advances to step S104, where the travel controller 10 determines that the driver is not currently performing an intervening (overriding) steering operation. The travel controller 10 then exits the routine.

When it is determined in step S103 that the relationship between the steering wheel angle θH detected by the steering wheel angle sensor 12b and the yaw rate γ detected by the yaw rate sensor 12c is within the override determination area, on the other hand, the routine advances to step S105, where the travel controller 10 determines that the driver is currently performing an intervening (overriding) steering operation. The travel controller 10 then exits the routine.

According to this implementation, the driver is determined to have performed an intervening steering operation when the relationship between the steering wheel angle θH detected on the steering wheel 34 side of the torsion bar 32a and the yaw rate γ acting on the vehicle differs to a predetermined extent from the reference characteristic DO of the steering wheel angle θH and the yaw rate γ, the reference characteristic DO varying univocally when the steering wheel 34 is in the no load condition. Accordingly, an intervening steering operation performed by the driver can be determined accurately even when a malfunction occurs in the steering system during automatic driving. As a result, the occurrence of an intervening steering operation by the driver can be determined accurately, whereupon steering and so on by the driver can be prioritized, even during evacuation travel and so on executed in response to a malfunction in the steering torque sensor 12a or the like.

Note that the present invention is not limited to the implementation described above, and may be subjected to various amendments or modifications within the technical scope of the present invention. For example, in the control described as an example in the above implementation, the occurrence of an intervening (overriding) steering operation by the driver is determined on the basis of the relationship between the steering wheel angle θH and the yaw rate γ (the lateral force) only when a malfunction occurs in the steering system, but the present invention is not limited thereto, and may be applied to situations other than a malfunction in the steering system.

The invention claimed is:

1. A travel control apparatus for a vehicle, the travel control apparatus having a travel environment information acquisition unit that acquires travel environment information relating to a travel environment in which the vehicle travels, and a travel information detector that detects travel information relating to the vehicle in order to execute automatic driving control on the basis of the travel environment information and the travel information relating to the vehicle, the travel control apparatus comprising:

a lateral force generator that generates lateral force to be applied to the vehicle during the automatic driving control;

a torsion bar interposed on a torque transmission path of a steering system that extends from a steering wheel to a steered wheel, the steering wheel configured to interlock with the lateral force generated by the lateral force generator;

a steering wheel angle detector that detects a steering wheel angle;

a lateral force detector that detects the lateral force acting on the vehicle; and an intervening steering operation determination unit that determines that a driver has performed an intervening steering operation when an actual characteristic of the steering wheel angle detected by the steering wheel angle detector and the lateral force detected by the lateral force detector during the automatic driving control differs from a reference characteristic of the steering wheel angle and the lateral force, the reference characteristics varying univocally for each vehicle speed according to an intervention by the lateral force generator when an intervening steering operation is in a no load condition where the intervening steering operation has not been performed by the driver to the steering wheel.

2. The travel control apparatus for a vehicle according to claim 1, wherein the lateral force generator generates the lateral force to be applied to the vehicle through control of an electric power steering motor that applies steering torque on the steering system.

3. The travel control apparatus for a vehicle according to claim 2, wherein the intervening steering operation determination unit does not determine whether the intervening steering operation has been performed by the driver when the steering wheel angle detected by the steering wheel angle detector during the automatic driving control is within a dead zone set in advance on the basis of a neutral steering wheel position.

4. The travel control apparatus for a vehicle according to claim 1, wherein the lateral force generator generates the lateral force to be applied to the vehicle through individual control of a brake force of each vehicle wheel.

5. The travel control apparatus for a vehicle according to claim 4, wherein the intervening steering operation determination unit does not determine whether the intervening steering operation has been performed by the driver when the steering wheel angle detected by the steering wheel angle detector during the automatic driving control is within a dead zone set in advance on the basis of a neutral steering wheel position.

6. The travel control apparatus for a vehicle according to claim 1, further comprising a malfunction detector that detects a malfunction in the steering system, wherein, when a malfunction occurs in the steering system, the lateral force generator generates the lateral force to be applied to the vehicle through either one of control of an electric power steering motor that applies steering torque on the steering system, and individual control of a brake force of each vehicle wheel, and the intervening steering operation determination unit determines whether the intervening steering operation has been performed by the driver on the basis of a comparison between the reference characteristic, which is set differently for control of the electric power steering motor and control of the brake force, and the actual characteristic of the steering wheel angle detected by the steering wheel angle detector and the lateral force detected by the lateral force detector.

7. The travel control apparatus for a vehicle according to claim 6, wherein the intervening steering operation determination unit does not determine whether the intervening steering operation has been performed by the driver when the steering wheel angle detected by the steering wheel angle detector during the automatic driving control is within a dead zone set in advance on the basis of a neutral steering wheel position.

8. The travel control apparatus for a vehicle according to claim 1, wherein the intervening steering operation determination unit does not determine whether the intervening steering operation has been performed by the driver when the steering wheel angle detected by the steering wheel angle detector during the automatic driving control is within a dead zone set in advance on the basis of a neutral steering wheel position.

9. A travel control apparatus for a vehicle, the travel control apparatus having a travel environment information acquisition unit that acquires travel environment information relating to a travel environment in which the vehicle travels, and a travel information detector that detects travel information relating to the vehicle in order to execute automatic driving control on the basis of the travel environment information and the travel information relating to the vehicle, the travel control apparatus comprising:

a lateral force generator that generates lateral force to be applied to the vehicle during the automatic driving control;

a torsion bar interposed on a torque transmission path of a steering system that extends from a steering wheel to a steered wheel, the steering wheel configured to interlock with the lateral force generated by the lateral force generator;

a steering wheel angle detector that detects a steering wheel angle;

a lateral force detector that detects the lateral force acting on the vehicle; and a travel controller configured to determine that a driver has performed an intervening steering operation during the automatic driving control when an actual characteristic of the steering wheel angle detected by the steering wheel angle detector and the lateral force detected by the lateral force detector during the automatic driving control differs from a reference characteristic of a reference steering wheel angle and a reference lateral force, wherein the reference steering wheel angle and the reference lateral force are preset based on the wheel angle and the lateral force in no load condition where the intervening steering operation has not been performed by the driver to the steering wheel during applying the lateral force to the vehicle, and the reference characteristics are varied univocally according to each vehicle speed of the vehicle.

10. The travel control apparatus for a vehicle according to claim 9, wherein the lateral force generator generates the lateral force to be applied to the vehicle through control of an electric power steering motor that applies steering torque on the steering system.

11. The travel control apparatus for a vehicle according to claim 9, wherein the lateral force generator generates the lateral force to be applied to the vehicle through individual control of a brake force of each vehicle wheel.

12. The travel control apparatus for a vehicle according to claim 9, wherein the travel controller does not determine whether the intervening steering operation has been performed by the driver when the steering wheel angle detected by the steering wheel angle detector is within a dead zone set in advance on the basis of a neutral steering wheel position.

13. A travel control apparatus for a vehicle, the travel control apparatus having a travel environment information acquisition unit that acquires travel environment information relating to a travel environment in which the vehicle travels, and a travel information detector that detects travel information relating to the vehicle in order to execute automatic driving control on the basis of the travel environment information and the travel information relating to the vehicle, the travel control apparatus comprising:
- a lateral force generator that generates lateral force to be applied to the vehicle during the automatic driving control;
- a torsion bar interposed on a torque transmission path of a steering system that extends from a steering wheel to a steered wheel, the steering wheel configured to interlock with the lateral force generated by the lateral force generator;
- a steering wheel angle detector that detects a steering wheel angle;
- a lateral force detector that detects the lateral force acting on the vehicle; and
- a travel controller configured to detect at least a malfunction in the steering system, and to control the lateral force generator so that the lateral force generator generates the lateral force based on the detection of the malfunction during the automatic driving control,
- wherein the travel controller is further configured to determine that a driver has performed an intervening steering operation during the automatic driving control when an actual characteristic of the steering wheel angle detected by the steering wheel angle detector during applying the lateral force to the vehicle and the lateral force detected by the lateral force detector during the automatic driving control differs from a reference characteristic of a reference steering wheel angle and a reference lateral force, the reference steering wheel angle and the reference lateral force are preset based on the wheel angle and the lateral force in no load condition where the intervening steering operation has not been performed by the driver to the steering wheel during applying the lateral force to the vehicle, the reference characteristics are varied univocally according to each vehicle speed of the vehicle.

14. The travel control apparatus for a vehicle according to claim 13, wherein the lateral force generator generates the lateral force to be applied to the vehicle through control of an electric power steering motor that applies steering torque on the steering system.

15. The travel control apparatus for a vehicle according to claim 13, wherein the lateral force generator generates the lateral force to be applied to the vehicle through individual control of a brake force of each vehicle wheel.

16. The travel control apparatus for a vehicle according to claim 13, wherein the travel controller does not determine whether the intervening steering operation has been performed by the driver when the steering wheel angle detected by the steering wheel angle detector is within a dead zone set in advance on the basis of a neutral steering wheel position.

* * * * *